United States Patent
Chang et al.

(10) Patent No.: US 9,509,420 B2
(45) Date of Patent: Nov. 29, 2016

(54) ELECTROMAGNETIC RADIATION ALERTING SYSTEM AND METHOD

(71) Applicant: FIH (HONG KONG) LIMITED, Kowloon (HK)

(72) Inventors: Hao-Ying Chang, New Taipei (TW); Chi-Sheng Liu, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/716,563

(22) Filed: May 19, 2015

(65) Prior Publication Data

US 2016/0315718 A1 Oct. 27, 2016

(30) Foreign Application Priority Data

Apr. 23, 2015 (CN) .......................... 2015 1 0196171

(51) Int. Cl.
*H04B 17/00* (2015.01)
*H04B 17/10* (2015.01)
*G08B 21/02* (2006.01)

(52) U.S. Cl.
CPC ............ *H04B 17/102* (2015.01); *G08B 21/02* (2013.01)

(58) Field of Classification Search
CPC ... H04W 24/00; H04W 16/14; H04W 28/04; H04B 17/0065; H04B 17/0042; H04B 17/0057; H04B 1/525; H04B 1/1027; H04M 1/72519

USPC ............ 455/63.1, 67.11, 67.13, 67.7, 550.1, 455/90.1

See application file for complete search history.

(56) References Cited

U.S. PATENT DOCUMENTS

| | | | | |
|---|---|---|---|---|
| 4,983,981 A | * | 1/1991 | Feldman | H01Q 3/28 342/372 |
| 2005/0059362 A1 | * | 3/2005 | Kalajo | H03F 1/0261 455/127.1 |
| 2005/0260955 A1 | * | 11/2005 | Bielmeier | H03G 3/3047 455/115.1 |
| 2014/0364088 A1 | * | 12/2014 | Nakata | G06Q 10/10 455/412.2 |

* cited by examiner

*Primary Examiner* — Nhan Le
(74) *Attorney, Agent, or Firm* — Zhigang Ma

(57) ABSTRACT

An electronic device includes a radio frequency power amplifier, a storage device, at least one processor, and one or more modules that are stored in the storage device and executed by the at least one processor. The one or more modules includes a power obtaining module, a comparing module, and an indicating module. The power obtaining module obtains an output power of the radio frequency power amplifier. The comparing module compares the output power of the radio frequency power amplifier obtained by the power obtaining module with at least one pre-determined value, and the comparing module outputs a comparing result according the comparison of the output power and the at least one pre-determined value. The indicating module generates an alerting signal according to the comparing result output from the comparing module, for indicating electromagnetic radiation of the electronic device.

11 Claims, 2 Drawing Sheets

ELECTROMAGNETIC RADIATION ALERTING SYSTEM AND METHOD

FIELD

The subject matter herein generally relates to electromagnetic radiation alerting systems, and more particularly to an electromagnetic radiation alerting and an electromagnetic radiation alerting method for use with a mobile telephone.

BACKGROUND

To communicate with a network, mobile phones radiate electromagnetic waves when being used. Antennas in the mobile phones are used for receiving and transmitting signals for communication. These antennas are a source of electromagnetic radiation that are handled close against its users which leads to greater exposure and absorption of electromagnetic radiation by the user's body. In addition, specific absorption rate (SAR) is the measure of an amount of electromagnetic radiation absorbed by the user's body that is exposed to the mobile phones and has a unit of watts per kilogram (W/kg).

BRIEF DESCRIPTION OF THE DRAWINGS

Implementations of the present technology will now be described, by way of example only, with reference to the attached figures.

DETAILED DESCRIPTION

Figure 1:
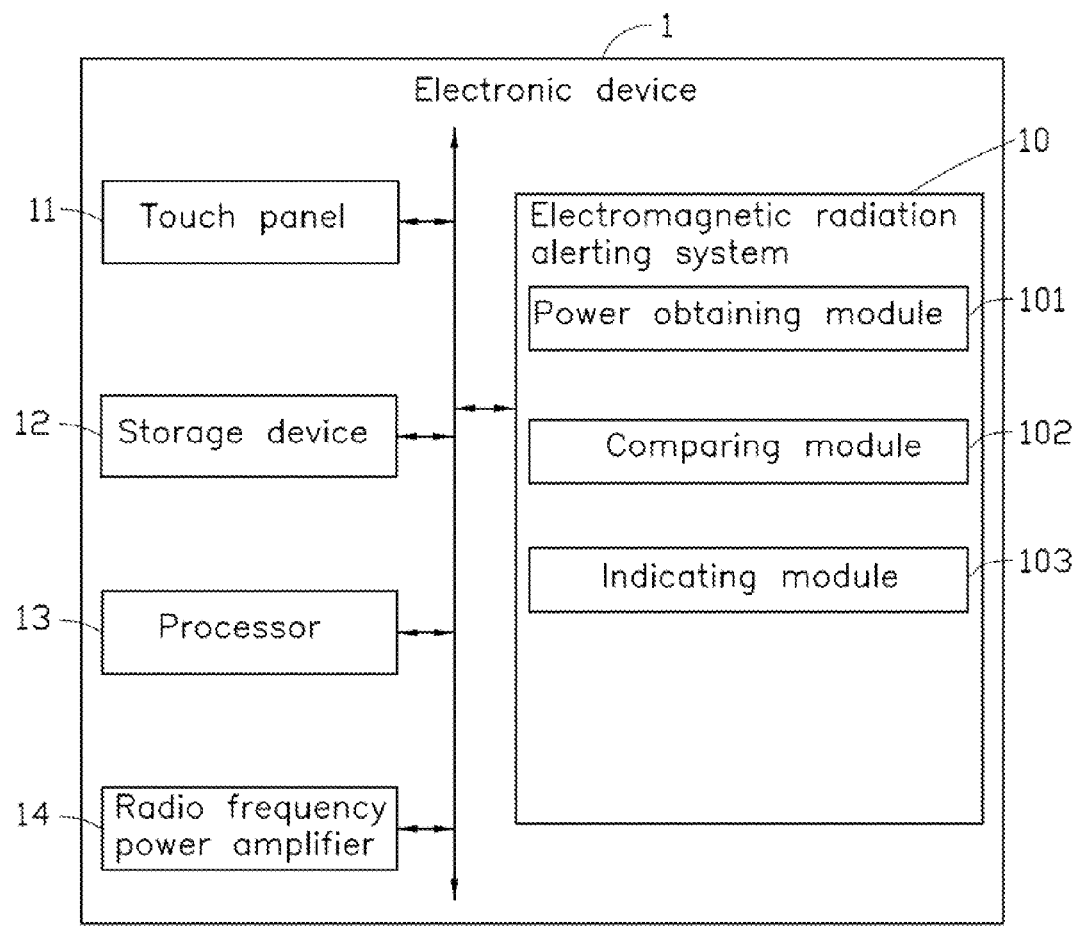
FIG. 1 is a block diagram of an electronic device employing an electromagnetic radiation alerting system, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to an electromagnetic radiation alerting system and an electromagnetic radiation alerting method using the same.

FIG. 1 illustrates an embodiment of an electronic device 1 including an electromagnetic radiation alerting system 10, according to an exemplary embodiment. The electronic device 1 can be a cell phone, a smart watch, a personal digital assistant, a tablet computer, or any other computing device.

The electronic device 1 further includes a touch panel 11, a storage device 12 providing one or more memory functions, and at least one processor 13. The touch panel 11 is used to input and output relevant data, such as texts, for example. In at least one embodiments, the touch panel 11 can be a capacitive touch panel or a resistive touch panel that offers multi-touch capability. In at least one embodiment, the electromagnetic radiation alerting system 10 may include computerized instructions in the form of one or more programs, which are stored in the storage device 12 and executed by the processor 13 to perform operations of the electronic device 1.

The storage device 12 stores one or more programs, such as programs of the operating system, other applications of the electronic device 1, and various kinds of data, such as animated visual images. In some embodiments, the storage device 12 may include a memory of the electronic device 1 and/or an external storage card, such as a memory stick, a smart media card, a compact flash card, or any other type of memory card. FIG. 1 illustrates only one example of the electronic device 1 that may include more or fewer components than as illustrated, or have a different configuration of the various components. The processor 13 can be a microcontroller.

The electronic device 1 further includes a radio frequency power amplifier (RF PA) 14. The radio frequency power amplifier 14 is electronically coupled to the processor 13 and is configured to amplify radio frequency signals output from an oscillation circuit (not shown) of the electronic device 1. Thus, the amplify radio frequency signals with adequate output power can be transmitted by an antenna of the electronic device 1.

In at least one embodiment, the electromagnetic radiation alerting system 10 may include one or more modules, for example, a power obtaining module 101, a comparing module 102, and an indicating module 103. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The power obtaining module 101 is configured to obtain an output power of the radio frequency power amplifier 14. In at least one embodiment, the power obtaining module 101 obtains a voltage value U and a corresponding current value I of the radio frequency power amplifier 14, and then calculates the output power P of the radio frequency power amplifier 14 according to the voltage value U and the current value I (P=UI). Generally, the output power of the radio frequency power amplifier 14 can be increased to maintain quality of communication between the electronic device 1 and a base station when the radio frequency signals are weak. In addition, at the moment when a call communication is established by the electronic device 1, the radio frequency power amplifier 14 may trigger an instantaneous pulse, and thus the output power of the radio frequency power amplifier 14 is significantly increased.

The comparing module 102 is configured to compare the output power of the radio frequency power amplifier 14 obtained by the power obtaining module 101 with at least one pre-determined value, and then the comparing module 102 outputs a comparing result according to the comparison of the output power and the at least one pre-determined value. In at least one embodiment, the at least one pre-determined value includes a first power threshold and a second power threshold, both the first power threshold and the second power threshold are stored in the storage device 12, and each of the first power threshold and the second power threshold corresponds to a specific absorption rate (SAR) value. Generally, the output power of the radio frequency power amplifier 14 is associated with the SAR value of the electronic device 1. For example, when the output power of the radio frequency power amplifier 14 is about 22 dBm, the SAR value is about 0.3 W/Kg. When the output power of the radio frequency power amplifier 14 is about 29 dBm, the SAR value is about 1.06 W/Kg. In at least one embodiment, the first power threshold is 35 dBm, the second power threshold is 36 dBm, at this time, the SAR value can be about 1.6 W/Kg which may lead to greater exposure and absorption of electromagnetic radiation by user's body.

In detail, when the output power of the radio frequency power amplifier 14 is less than the first power threshold, the comparing module 102 outputs a first comparing result. When the output power of the radio frequency power amplifier 14 is greater than or equal to the first power threshold and is less than the second power threshold, the comparing module 102 outputs a second comparing result. When the output power of the radio frequency power amplifier 14 is greater than or equal to the second power threshold, the comparing module 102 outputs a third comparing result.

The indicating module 103 is configured to generate an alerting signal according to the comparing result output from the comparing module 102, for indicating electromagnetic radiation of the electronic device. The alerting signal may at least include one of texts, colors, images, videos, sounds, and vibrations. In at least one embodiment, the alerting signal includes a combination of the texts and the colors. The texts and the colors are pre-stored in the storage device 12 and can be displayed on the touch panel 11. In detail, when the comparing module 102 outputs the first comparing result, the indicating module 103 generates a first alerting signal, and the first alerting signal can be a string of texts with green colors, such as "electromagnetic radiation: safe". When the comparing module 102 outputs the second comparing result, the indicating module 103 generates a second alerting signal, and the second alerting signal can be a string of texts with orange colors, such as "electromagnetic radiation: dangerous". When the comparing module 102 outputs the third comparing result, the indicating module 103 generates a third alerting signal, and the third alerting signal can be a string of texts with red colors, such as "electromagnetic radiation: extremely dangerous". Optionally, the processor 13 provides a pop-up window displayed on the touch panel 11, and a content of the pop-up window can include, but is not limited to, the alerting signal.

Figure 2:
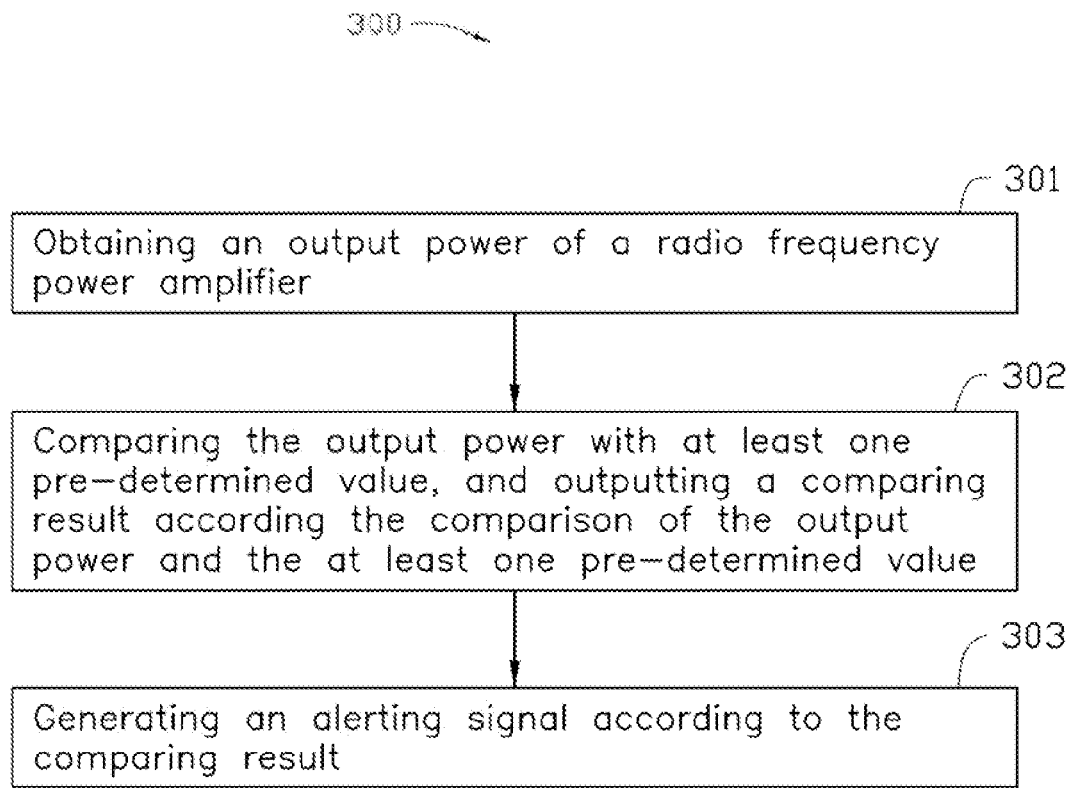
FIG. 2 is a flowchart of one embodiment of an electromagnetic radiation alerting method using the electromagnetic radiation alerting system of FIG. 1.

FIG. 2 illustrates a flowchart of an example electromagnetic radiation alerting method 300 of the disclosure. The electromagnetic radiation alerting method 300 is provided by way of example, as there are a variety of ways to carry out the electromagnetic radiation alerting method 300. The electromagnetic radiation alerting method 300 described below can be carried out using the functional units of the electromagnetic radiation alerting system 10 as illustrated in FIG. 1, for example, and various elements of this figure are referenced in explaining the example electromagnetic radiation alerting method 300. Each block shown in FIG. 2 represents one or more processes, methods, or subroutines which are carried out in the example electromagnetic radiation alerting method 300. Furthermore, the order of blocks is illustrative only and the order of the blocks can change. Additional blocks can be added or fewer blocks may be utilized without departing from the scope of this disclosure. The example electromagnetic radiation alerting method 300 can begin at block 301.

At block 301, the power obtaining module obtains the output power of the radio frequency power amplifier.

At block 302, the comparing module compares the output power of the radio frequency power amplifier obtained by the power obtaining module with the at least one pre-determined value, and then outputs the comparing result according the comparison of the output power and the at least one pre-determined value. For example, at the moment when a call communication is established by the electronic device, the output power of the radio frequency power amplifier is significantly increased. If the output power of the radio frequency power amplifier is greater than or equal to the second power threshold, the comparing module outputs the third comparing result.

At block 303, the indicating module generates the alerting signal according to the comparing result output from the comparing module. For example, when the comparing module outputs the third comparing result, the indicating module generates the third alerting signal. Thus, a string of texts with red colors, such as "electromagnetic radiation: extremely dangerous" are displayed on the touch screen to notify the user to keep distance with the electronic device.

In addition, after the call communication has been established by the electronic device, the output power of the radio frequency power amplifier can be less than the first power threshold. Thus, the comparing module outputs the first comparing result, and the indicating module generates the first alerting signal. At this time, a string of texts with green colors, such as "electromagnetic radiation: safe" are displayed on the touch screen to notify the user.

In summary, the power obtaining module 101 obtains the output power of the radio frequency power amplifier 14, the comparing module 102 compares the output power with the at least one pre-determined value and outputs the comparing result accordingly, and the indicating module 103 generates the alerting signal according to the comparing result to notify the user. Thus, the electromagnetic radiation alerting system 10 is capable of effectively detecting the electromagnetic radiation of the electronic device 1, to achieve the optimized solution by reducing SAR simultaneously maintaining the quality of communication.

The embodiments shown and described above are only examples. Many details are often found in the art such as the other features of the electromagnetic radiation alerting system and the electromagnetic radiation alerting method using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device comprising:
   a storage device;
   at least one processor coupled to the storage device;
   a radio frequency power amplifier coupled to the processor;
   wherein, a power obtaining module is stored on the storage device and is executable by the processor and the power obtaining module is configured to obtain an output power of the radio frequency power amplifier;
   wherein a comparing module is stored on the storage device and is executable by the processor and the comparing module is configured to compare the output power of the radio frequency power amplifier obtained by the power obtaining module with at least one pre-determined value and output a comparing result according the comparison of the output power and the at least one pre-determined value;
   wherein the at least one pre-determined value comprises a first power threshold and a second power threshold, when the output power of the radio frequency power amplifier is less than the first power threshold, the comparing module outputs a first comparing result, when the output power of the radio frequency power amplifier is greater than or equal to the first power threshold and is less than the second power threshold, the comparing module outputs a second comparing result, when the output power of the radio frequency power amplifier is greater than or equal to the second power threshold, the comparing module outputs a third comparing result; and
   wherein an indicating module is stored on the storage device and is executable by the computer processor and the indicating module is configured to generate an alerting signal according to the comparing result output from the comparing module.

2. The electronic device as claimed in claim 1, wherein the power obtaining module obtains a voltage value and a corresponding current value of the radio frequency power amplifier, and calculates the output power of the radio frequency power amplifier according to the voltage value and the current value.

3. The electronic device as claimed in claim 1, wherein both the first power threshold and the second power threshold are stored in the storage device, and each of the first power threshold and the second power threshold corresponds to a specific absorption rate (SAR) value.

4. The electronic device as claimed in claim 1, wherein when the comparing module outputs the first comparing result, the indicating module generates a first alerting signal, when the comparing module outputs the second comparing result, the indicating module generates a second alerting signal, when the comparing module outputs the third comparing result, the indicating module generates a third alerting signal.

5. The electronic device as claimed in claim 1, further comprising a touch panel, wherein the alerting signal comprises a combination of texts and colors, the texts and the colors are pre-stored in the storage device and are displayed on the touch panel.

6. A computer-implemented method for electromagnetic radiation alerting using an electronic device, the electronic device comprising a radio frequency power amplifier, the method comprising execution of steps comprising:
   obtaining, by a power obtaining module, an output power of the radio frequency power amplifier;
   comparing, by a comparing module, the output power of the radio frequency power amplifier obtained by the power obtaining module with at least one pre-determined value, and outputting a comparing result according the comparison of the output power and the at least one pre-determined value; and
   generating, by an indicating module, an alerting signal according to the comparing result output from the comparing module, for indicating electromagnetic radiation of the electronic device;
   wherein the at least one pre-determined value comprises a first power threshold and a second power threshold, when the output power of the radio frequency power amplifier is less than the first power threshold, the comparing module outputs a first comparing result, when the output power of the radio frequency power amplifier is greater than or equal to the first power threshold and is less than the second power threshold, the comparing module outputs a second comparing result, when the output power of the radio frequency power amplifier is greater than or equal to the second power threshold, the comparing module outputs a third comparing result.

7. The method as claimed in claim 6, wherein when the comparing module outputs the first comparing result, the indicating module generates a first alerting signal, when the comparing module outputs the second comparing result, the indicating module generates a second alerting signal, when the comparing module outputs the third comparing result, the indicating module generates a third alerting signal.

8. The method as claimed in claim 6, wherein the alerting signal comprises a combination of texts and colors, the texts and the colors are pre-stored in a storage device and are displayed on a touch panel of the electronic device.

9. A non-transitory storage medium having stored instructions that, when executed by a processor of an electronic device, causes the electronic device to perform a method for electromagnetic radiation alerting, the electronic device comprising a radio frequency power amplifier, the method comprising:
   obtaining, by a power obtaining module, an output power of the radio frequency power amplifier;
   comparing, by a comparing module, the output power of the radio frequency power amplifier obtained by the power obtaining module with at least one pre-determined value, and outputting a comparing result according the comparison of the output power and the at least one pre-determined value; and
   generating, by an indicating module, an alerting signal according to the comparing result output from the comparing module, for indicating electromagnetic radiation of the electronic device;
   wherein the at least one pre-determined value comprises a first power threshold and a second power threshold, when the output power of the radio frequency power amplifier is less than the first power threshold, the comparing module outputs a first comparing result, when the output power of the radio frequency power amplifier is greater than or equal to the first power threshold and is less than the second power threshold, the comparing module outputs a second comparing result, when the output power of the radio frequency power amplifier is greater than or equal to the second power threshold, the comparing module outputs a third comparing result.

10. The non-transitory storage medium as claimed in claim 9, wherein when the comparing module outputs the first comparing result, the indicating module generates a first alerting signal, when the comparing module outputs the second comparing result, the indicating module generates a second alerting signal, when the comparing module outputs the third comparing result, the indicating module generates a third alerting signal.

11. The non-transitory storage medium as claimed in claim 9, wherein the alerting signal comprises a combination of texts and colors, the texts and the colors are pre-stored in a storage device and are displayed on a touch panel of the electronic device.

* * * * *